United States Patent [19]

Knepler

[11] 4,112,777

[45] Sep. 12, 1978

[54] AIR PRESSURE MONITOR

[75] Inventor: John T. Knepler, Chatham, Ill.

[73] Assignee: Dickey-john Corporation, Auburn, Ill.

[21] Appl. No.: 808,807

[22] Filed: Jun. 30, 1977

[51] Int. Cl.² .............................................. G01L 9/10
[52] U.S. Cl. ........................................ 73/728; 73/714
[58] Field of Search ..................... 73/398 R, 204, 728, 73/714; 331/65

[56] References Cited

U.S. PATENT DOCUMENTS 3,750,474  8/1973  Pollack .............................. 73/398 R

OTHER PUBLICATIONS

Hibberd, "Integrated Circuits" McGraw-Hill Book Co., N.Y., p. 6, 1969.

*Primary Examiner*—Donald O. Woodiel
*Attorney, Agent, or Firm*—Olson, Trexler, Wolters, Bushnell & Fosse, Ltd.

[57] ABSTRACT

An air pressure monitor includes an electro-mechanical sensor comprising a flexible diaphragm whose deflection is proportional to the air pressure applied thereto, and a variable inductor including a coil and a movable core inside of the coil, the movable core being attached to the flexible diaphragm for movement in response to the deflection thereof to adjust the inductance of the coil in proportion to the air pressure applied to the diaphragm. The monitor further comprises electrical circuits including a first oscillator circuit including the coil for producing a pressure signal at a frequency proportional to the pressure in response to the inductance of the coil, and a second oscillator circuit for producing a reference signal at a frequency corresponding to the frequency produced by the first oscillator when the pressure is substantially zero. Mixer and filter circuits are provided, connected to the two oscillator circuits for providing a signal whose frequency is proportional to the difference in frequencies between the pressure and reference signals and a Schmitt trigger and divider are connected in series from the filter circuit for producing a chain of digital pulses at a frequency proportional to that of the difference signal. An adjustable gate generator is provided for producing a gate signal having a predetermined period, such that the number of digital pulses produced at the output of the divider during the predetermined period comprises a digital signal corresponding to a measurement in predetermined, fixed units of the pressure at the diaphragm.

9 Claims, 5 Drawing Figures

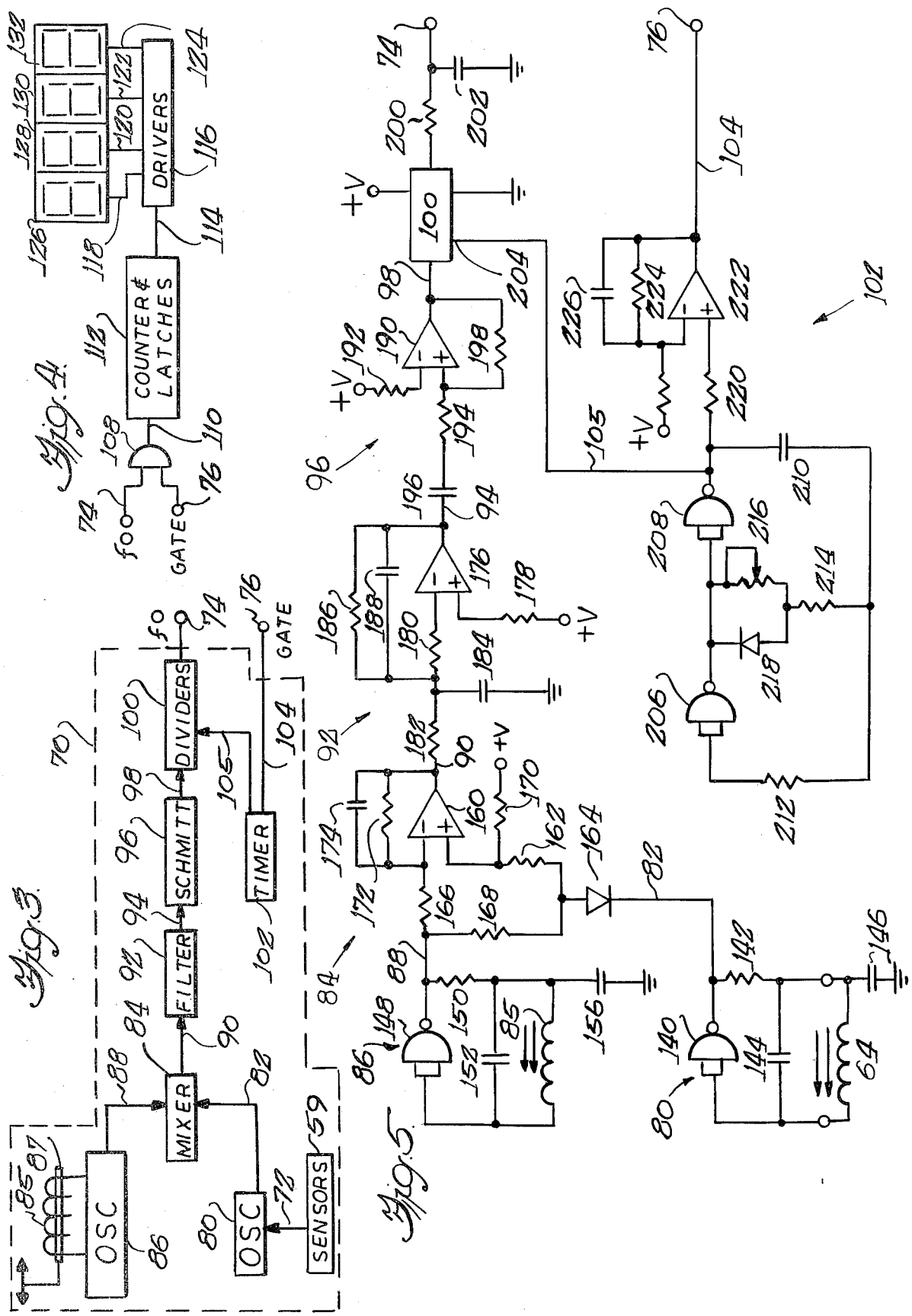

AIR PRESSURE MONITOR

BACKGROUND OF THE INVENTION

This invention relates generally to apparatus for monitoring air pressure, and more particularly to an air pressure monitor adapted for use with a seed planting machine of the type utilizing a rotating drum with pressurized air applied thereto for the planting of seeds.

In many types of machines, apparatus and systems, it is necessary or desirable to monitor an air pressure for providing an indication thereof to an operator of the machine, apparatus or system. While the apparatus according to the present invention may be used for pressure measurement or monitoring in a wide range of applications, the disclosure will be facilitated by addressing the problem of monitoring air pressure in a seed planting machine.

Automatic seed planting apparatus has been developed to facilitate the planting of large fields of crops by a farmer with a minimum of time and manpower. Such seed planting apparatus may be equipped with a plurality of seed dispensing nozzles so that a plurality of rows of seed can be planted in a single pass over a particular area of field. For example, four, six, eight or more rows can be planted during a single planting operation. One type of seed planting apparatus contemplated for use with the present invention is one wherein a large hopper or hoppers containing seed to be planted is positioned for delivering seed to a rotating drum. To facilitate delivery of the seed from the hopper to the drum and from the drum to the ground, a power driven blower supplies air under pressure to the hopper and drum through a suitably connected air duct. The hopper and drum pressures are maintained substantially equalized. The drum includes a plurality of apertures or pockets formed in rows about the circumference of the interior circular wall of the drum, the number of apertures or pockets per row corresponding to the number of rows planted simultaneously by the planter. Near the top of the revolving drum, on the exterior surface thereof, a seed release wheel contacts each pocket and releases the seed held therein. As the seeds are released from the pockets they are caught by the air flow produced by the blower and carried through a discharge manifold positioned in registry with the pockets and release wheels, to respective delivery tubes where the seeds are dispensed in their appropriate rows.

In such a seed planting apparatus, the pressure in the drum must be controlled to obtain a suitable amount of pressure for holding the seeds in the pockets and dispensing the seeds through the manifold. For example, in order to properly dispense light seeds such as beets, three to four ounces of pressure should be maintained in the drum, whereas to dispense relatively heavy seeds such as corn, ten to twelve ounces of pressure should be maintained. Heretofore, a mechanical pressure gauge was generally mounted on the planter, for example, on a hopper thereof to monitor the air pressure of the hopper and drum. A suitable regulating mechanism such as a manually actuatable valve is provided, accessible to an operator for adjusting the power driven blower to supply the desired amount of air pressure for the particular seeds being planted. Thus, it is necessary for a farmer utilizing such a planting apparatus to periodically look behind the tractor to visually inspect the pressure gauge on the planter to insure that the proper air pressure is being maintained.

OBJECTS AND SUMMARY OF THE INVENTION

Accordingly, it is a general object of this invention to provide an air pressure monitoring system whereby a farmer need not divert his attention from operation of the tractor to inspect a pressure gauge or the like, mounted on the planter behind him.

A more specific object of this invention is to provide a new and improved air pressure monitor wherein a convenient and easy to read digital indication of the air pressure may be positioned remotely of the planter, in front of the operator, thereby enabling the operator to maintain his vision on the direction of travel of the tractor for safe operation thereof.

Another object of this invention is to provide an improved air pressure monitor for seed planting apparatus which is adapted to provide an output signal representative of air pressure in a form suitable for use with a digital display console.

Another object of this invention is to provide an air pressure monitor which is relatively small and compact and adapted to be easily installed upon existing seed planting apparatus by making simple connections thereto.

Still another object of this invention is to provide an improved air pressure monitor which is highly reliable in operation and whose output is substantially unaffected by thermal effects or aging in the electrical circuit components thereof.

Briefly, in accordance with the foregoing objects, an air pressure monitor according to the present invention comprises electro-mechanical sensor means having a variable impedance which varies systematically according to the air pressure applied to the sensor means. Circuit means are provided connected to the sensor means for producing output signals corresponding to the air pressure applied to the sensor means and suitable for driving a digital display in response to the variable impedance of the sensor means. The circuit means include means connected to the sensor means for producing a pressure signal at a frequency proportional to the pressure applied in response to the impedance of the sensor means, means for producing a reference signal at a frequency corresponding to the frequency of the pressure signal produced by the first mentioned means when the pressure is substantially zero. The circuit means further include means connected to the pressure and reference signal producing means for producing a difference signal at a frequency corresponding to the difference between the frequencies of the pressure and reference signals and means including means connected to said difference signal producing means for adjusting the difference signal to provide the aforementioned output signals corresponding to the air pressure in a form suitable for driving a digital display.

In a preferred embodiment the pressure signal and reference signal producing means comprise a pair of substantially identical oscillator circuits, and the sensor means includes a variable inductor whose inductance varies according to the applied pressure and which is connected in the oscillator circuit for producing the pressure signal. Also in a preferred embodiment, the two oscillator circuits each include an electronic logic gate, as the active component thereof, the two electronic logic gates being formed on the same integrated circuit chip. Further in a preferred embodiment, the reference oscillator circuit includes a variable inductor for adjusting the frequency of the reference signal produced thereby, which inductor is substantially identical to the variable inductor provided in the pressure signal producing oscillator. Thus, as the two oscillators circuits include substantially identical components as described, variations or shifts in the frequency outputs thereof due to temperature, aging of the components thereof, or the like are substantially matched. Therefore, the difference signal producing means substantially cancels such shifts or variation, providing a high degree of accuracy to the monitor.

Other objects, features and advantages of the invention will be more fully realized and understood from the following detailed description, together with the accompanying drawings wherein like reference numerals are used throughout to designate like elements and components.

BRIEF DESCRIPTION OF THE DRAWINGS

FIG. 3 is a block diagram of the air pressure monitor of the present invention;

FIG. 4 is a schematic diagram, partially in block form, of a digital display device suitable for use with the air pressure monitor of the present invention; and FIG. 5 is a schematic circuit diagram, illustrating elements of FIG. 3 in additional detail.

DETAILED DESCRIPTION

Figure 1:
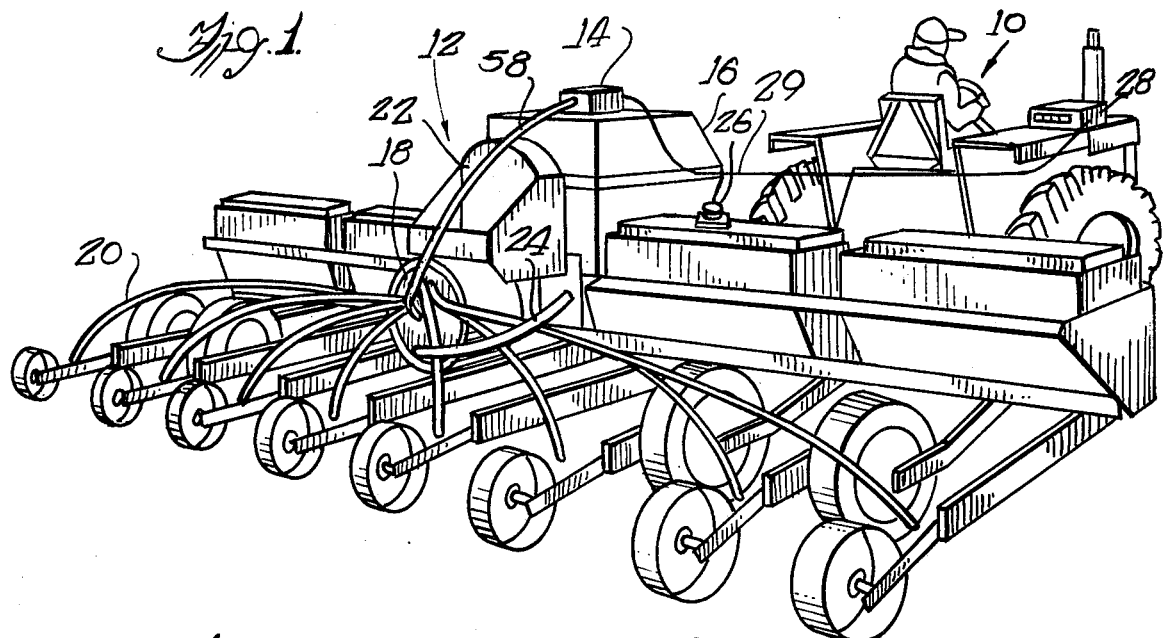
FIG. 1 is a perspective view of a tractor and seed planting apparatus wherein the air pressure monitor of this invention is utilized.

Referring now to FIG. 1, a tractor 10 is shown pulling an automatic seed planting apparatus, designated generally 12, wherein an air pressure monitor 14 of this invention is incorporated. The planter 12 includes one or more hoppers 16 for holding a supply of seed to be planted and a revolving drum 18 to receive the seed from the hopper 16 and distribute it via a number of delivery tubes 20 to be dispensed to appropriate planting rows. The planter 12 also includes a housing 22 containing a suitable power driven blower for supplying air under pressure to the hopper 16 and drum 18, the seeds to be planted and pressurized air being supplied to the drum 18 from the hopper 16 via a suitably connected duct or tube 24. A suitable control means such as a manually operated valve 26 is provided accessible to the operator as, for example, mounted on the planter 12, for adjusting the blower contained in the housing 22 for controlling the air pressure in the hoppers 16 and drum 18. A suitable read-out console 28 is also provided, positioned on the tractor 10 in front of the operator, enabling the operator to maintain his vision on the direction of travel of the tractor 10 while still observing a digital indication of the air pressure in the hopper 16 and drum 18. Suitable electrical connecting means such as a cable 29 is provided between the display console 28 and the air pressure monitor 14. The remaining elements of the tractor 10 and planter 12 are of known construction and need not be described in detail herein.

Figure 2:
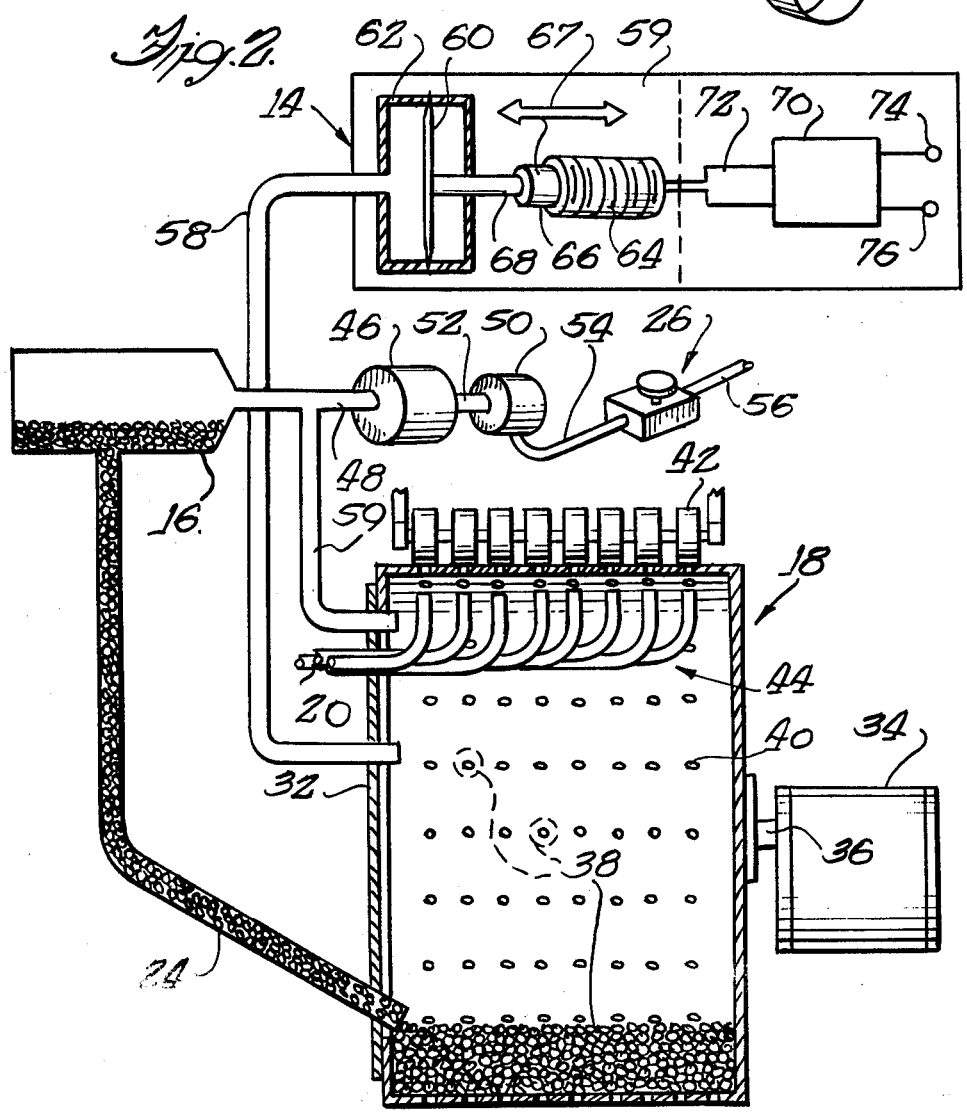
FIG. 2 is a cut-away view of a planting drum of the seed planter of FIG. 1 together with a diagramatic representation of other components of the seed planter of FIG. 1 and the monitor of the present invention.

Referring now to FIG. 2, a partially cut-away view of the drum illustrates additional details thereof, together with the air pressure monitor 14 of the present invention and additional parts of the planter 12 associated therewith. In order to facilitate the illustration of the various elements and to show the cooperation therebetween, the relative proportions of parts have not been maintained in FIG. 2. In the particular embodiment shown for the purpose of illustrating the invention, the planter 12 and drum 18 are of the type adapted to plant eight rows of seeds simultaneously. It will be understood, however, that the air pressure monitor of the present invention may be associated with planters adapted to plant any desired number of rows of seeds.

The drum 18 includes one end wall 32 which remains stationary while the rest of the drum 18 is rotatable by suitable means such as a motor 34 connected to the drum 18 by a shaft 36. The duct 24 enters the drum through stationary end wall 32 and delivers seeds 38 thereto as well as air under pressure from the hopper 16. The drum 18 is provided with a plurality of holes 40 arranged in rows and columns around the inner circumference of the drum, each column corresponding to one planting row. A plurality of rollers 42 are provided mounted in contact with the top of the drum 18 each roller 42 associated with a corresponding column of holes 40. A manifold 44 comprising a number of tubes corresponding to the seed delivery tubes 20 is mounted inside the drum 18, each tube being associated with a corresponding one of the rollers 42. In operation, as the holes 40 come in contact with the rollers 42 during the rotation of the drum 18, the seeds 38 held in the holes 40 are released by the rollers 42 and carried by the air flow through the tubes of the discharge manifold 44 to the seed delivery tubes 20 to be dispensed into their appropriate rows.

Air under pressure is provided to the hopper 16 and via the duct 24 to the drum 18 by a blower 46, connected to the hopper 16 by a suitable air duct 48 and driven by a suitable motor 50 via a shaft 52. The motor 50 may comprise, for example, a hydraulic motor whose speed is regulated by controlling the flow of hydraulic fluid thereto via a conduit 54 by the valve 26 connected between the conduit 54 and a suitable source of hydraulic fluid (not shown) connected to the valve 26 by a conduit 56.

The air pressure monitor 14 is connected to the drum 18 by suitable conduit means 58, whereby the air pressure in the hopper 16 and drum 18, which are maintained substantially equalized via a connecting duct 59, is monitored by the air pressure monitor 14.

The air pressure monitor 14 includes an electromechanical sensor 59 including a flexible diaphragm 60 mounted in a suitable housing 62 connected to the conduit 58 whereby the deflection of the diaphragm 60 is proportional to the pressure in the hopper 16 and drum 18. The electro-mechanical sensor further includes a variable inductor comprising a coil 64 and a moveable core member 66 positioned in the coil 64 and connected to the flexible diaphragm 60 by suitable means such as a shaft 68 for movement in response to the deflection of the diaphragm 60. Thus, the position of the core 66 relative to the coil 64 adjusts the inductance thereof in response to the deflection of the flexible diaphragm 60 and in proportion to the pressure applied thereto. It will be appreciated that the relative positions of the core 66 and coil 64 may also be varied, for example, by attaching the coil 64 to be moved by the diaphragm 60 and holding the core 66 stationary. Circuit means 70 is connected by suitable electrical connecting lines 72 to the coil 64. The circuit means 70 is adapted to produce output signals at the terminals 74 and 76 thereof in response to the inductance of the coil 64, the output signals being suitable for driving a digital display device and corresponding to the air pressure applied to the sensor at the flexible diaphragm 60.

Referring now to FIG. 3, the circuit means 70 of FIG. 2 is illustrated in additional detail, in block diagrammatic form. The sensor means 59 is connected via the line 72 to a variable oscillator circuit 80 whose output is connected by a line 82 to a mixer circuit 84. A second oscillator circuit 86 has an output connected by a line 88 to a second input of the mixer circuit 84. The oscillator circuit 86 includes a variable inductor comprising a coil 85 and an adjustable core 87, similar to the coil 64 and core 66 of the sensor 59. The output of the mixer circuit 84 is connected by a line 90 to an input of a filter 92, whose output is connected by a line 94 to an input of a Schmitt trigger circuit 96. The output of the Schmitt trigger circuit 96 is connected by line 98 to the input of a divider circuit 100 which has an output at the terminal 74. A timing circuit 102 comprises a gate generator and has an output connected by a line 104 to the terminal 76 and by a line 105 to a reset input of the divider 100. The circuit 70 is adapted to produce at its output terminals 74 and 76, signals suitable for driving a digital display to provide an indication or read out corresponding to the pressure applied at the sensor 59. Specifically, the signal at the terminal 74 comprises a periodic electrical signal whose frequency corresponds to the air pressure applied at the air sensor 59. The signal at the output terminal 76 comprises a gate signal having an adjustable gate period such that the number of periods of the periodic electrical signal at the terminal 74 produced during the gate period corresponds to the pressure being monitored in predetermined, fixed units as, for example, ounces per square inch. It will be appreciated, then, that the output signals developed at the terminals 74 and 76 comprise suitable input signals for a digital display console.

Referring now to FIG. 4 a digital display circuit suitable for use with the air pressure monitor of the present invention is illustrated in diagrammatic form. The output terminals 74 and 76 are connected to the inputs of a two input AND gate 108, whose output is connected by a line 110 to an input of a counter and latch circuit 112. An output of the counter and latch circuit 112 is connected by a line 114 to a driver circuit 116 which comprises a suitable circuit for driving a plurality of seven-segment digital display elements. The driver circuit 116 is connected via lines 118, 120, 122 and 124 to four seven-segment digital display elements 126, 128, 130 and 132.

Referring now to FIG. 5, a schematic circuit diagram illustrates the elements of the circuit 70 of FIGS. 2 and 3 in additional detail. The oscillator 80 comprises a two input NAND gate 140 whose inputs are connected in common, and whose output is connected via a resistor 142 to a capacitor 144 whose opposite end is connected to the two inputs of the NAND gate 140. The coil 64 of the electro-mechanical sensor 59 is connected in parallel with the capacitor 144. The junction of the coil 64 and capacitor 144 with the resistor 142 is connected to a capacitor 146 whose opposite end is connected to ground. Similarly, the oscillator 86 comprises a two input NAND gate 148 whose two inputs are connected in common and whose output is connected via a resistor 150 to one side of a capacitor 152 whose other side is connected to the two inputs of the gate 148. The coil 85 is connected in parallel with the capacitor 152 and the junction of the resistor 150 with the capacitor 152 and coil 85 is connected to one side of a capacitor 156 whose other side is connected to ground.

The mixer circuit 84 comprises a balanced mixer including an operational amplifier 160. The non-inverting input of the operational amplifier 160 is connected via resistor 162 to the anode of a diode 164 whose cathode is connected to the line 82 from the output of the oscillator circuit 80. The inverting input of the operational amplifier 160 is connected via a resistor 166 to the line 88 from the output of the oscillator circuit 86. A resistor 168 is connected between the line 88 and the junction of the resistor 162 with the anode of the diode 164. A resistor 170 is provided connecting the non-inverting input of the operational amplifier 160 to a positive voltage supply. A feedback circuit including the parallel combination of a resistor 172 and a capacitor 174 is connected between the non-inverting input and the output at the line 90 of the operational amplifier 160.

The filter circuit 92 comprises a low pass filter including an operational amplifier 176. The non-inverting input of the operational amplifier 176 is connected via a resistor 178 to a positive voltage supply. The inverting input of the operational amplifier 176 is connected via a resistor 180 to the junction of a resistor 182 and a capacitor 184. The capacitor 184 has its opposite side connected to ground and the resistor 182 has its opposite end connected to the line 90 from the output of the mixer circuit 84. The output of the operational amplifier 176 is connected to the line 94 and via the parallel combination of a resistor 186 and a capacitor 188 to the junction of the resistor 180 with the resistor 182.

The Schmitt trigger 96 includes an operational amplifier 190 whose inverting input is connected via a resistor 192 to a positive voltage supply. The non-inverting input of the operational amplifier 190 is connected via a resistor 194 in series with a capacitor 196 to the line 94 from the low pass filter circuit 92. The output of the operational amplifier 190 is connected to the line 98 and via a feedback resistor 198 to the non-inverting input of the operational amplifier 190. The divider circuit 100 comprises, in a preferred embodiment, a divide-by-64 integrated circuit of the type generally designated 4024. An input of the divider circuit 100 is connected to the line 98 from the output of the Schmitt trigger circuit 96. The divider circuit 100 is provided with suitable connections to a positive voltage supply and to ground and the output thereof is connected via a resistor 200 to the output terminal 74. A capacitor 202 is connected between the output terminal 74 and ground. The resistor 200 and capacitor 202 comprise a pulse shaper for the output signal of the divider circuit 100. The divider circuit includes a reset terminal 204 which is connected via the line 105 to the timing circuit 102.

The timing circuit 102 includes a gate generator comprising a pair of two input NAND gates 206 and 208. The output of the NAND gate 206 is connected to both inputs of the NAND gate 208 whose output is connected via a capacitor 210 in series with a resistor 212 to both inputs of the NAND gate 206. A resistor 214 is connected in series with the parallel combination of a variable resistor 216 and a diode 218 between the junction of the capacitor 210 with resistor 212 and the junction of the output of the NAND gate 206 with the inputs of the NAND gate 208. The diode 218 has its anode connected to the resistor 214 and its cathode connected to the junction of the NAND gates 206 and 208. The output of the NAND gate 208 is connected to the line 105 from the reset terminal 204 of the divider 100 and to a resistor 220 whose opposite end is connected to the non-inverting input of an operational amplifier 222, which comprises an output buffer for the gate generator. The output of the operational amplifier 222 is connected to the line 104 from the terminal 76 and via the parallel combination of a resistor 224 with a capacitor 226 to the inverting input of the operational amplifier 222 which is also connected via a resistor 228 to a positive voltage supply.

For purposes of affording a more complete understanding of the invention, it is advantageous to provide at this juncture a functional description of the mode in which the component parts operate.

The variable oscillator circuit 80 produces a frequency proportional to the pressure applied to the sensor in response to the varying inductance of the coil 64, as determined by the position of the core 66 therein. Similarly, the oscillator circuit 86 produces a reference signal at a frequency corresponding to the frequency of the pressure signal produced by the oscillator 80 when the pressure applied to the sensor is substantially zero. This is accomplished by adjusting the position of the moveable slug or core member 87 inside of the coil 85 until the frequency of the output signal of the oscillator 86 is substantially identical to the frequency of the signal at the output of the oscillator 80 with no pressure applied to the sensor. It will also be noted that the components of the oscillator circuits 80 and 86 are substantially identical, and specifically, the NAND gates 140 and 148 are preferably formed on the same integrated circuit chip. Also, the coils 64 and 85 are substantially identical while the slug or core members 66 and 87 differ only in that the core member or slug 66 is adapted to be relatively easily moveable within the coil 64, whereas the core member or slug 87 is adapted to have a somewhat tighter fit inside of the coil 85 so that it tends to remain in the position at which it is set to obtain the proper reference frequency signal from the oscillator 86. It will be appreciated, then, that any frequency shifts due to temperature variations or aging of the components are effectively matched between the two oscillators, and since, as will be seen below, the output of the monitoring circuit corresponds to the difference in the frequencies of the two oscillators, any such frequency shifts are substantially cancelled, resulting in a high degree of accuracy of the monitor.

The mixer circuit 84 receives the pressure signal and reference signal from the oscillator circuits 80 and 86, respectively, and produces a number of output signals at different frequencies, including a frequency corresponding to the difference in frequencies between the two oscillator signals. In a preferred embodiment, the movement of the core member or slug 66 within the coil 64 is such that the frequency of the pressure signal produced by the oscillator circuit 80 decreases with increased pressure applied to the sensor, that is to say, is inversely proportional to the applied pressure. Thus, the filter circuit 92 comprises a low pass filter, adapted to pass to its output at line 94 only the lowest frequency signal produced by the mixer circuit 84, which comprises a difference signal at a frequency corresponding to the frequency of the reference signal from the oscillator 86 less the frequency of the pressure signal from the oscillator 80. The Schmitt trigger circuit 96 produces at its output a chain of pulses at substantially the same frequency as the difference signal provided at its input by the filter circuit 92. The hysteresis built into the Schmitt trigger 96 also effectively eliminates any higher frequency component still present in the difference signal at the output of the filter circuit 92 and serves to sharpen the rise and fall times of the signal to create substantially the pulse chain described above. The divider circuit 100 divides the frequency of the pulse chain output of the Schmitt trigger 96 to provide a signal at a suitable frequecny proportional to the pressure and to substantially eliminate any problems of loading or cross-talk which might occur in transmitting higher frequencies over a relatively long wire or cable to a display circuit or console. The pulse shaper comprising the resistor 200 and capacitor 202 slows the rise and fall times of the output pulse signals somewhat also to aid in eliminating cross-talk. The gate generator provides an appropriate gate signal at its output 76 to serve as an enabling signal for a display circuit, such as the circuit of FIG. 4. The enabling signal has a predetermined period such that the number of output pulses counted at the terminal 74 within the predetermined period comprises a digital signal which corresponds to the pressure in predetermined, fixed units, such as ounces per square inch. The variable resistor 216 is used to set the period of the gate signal produced by the gate generator. In a preferred embodiment, the period of the gate generator is set so that each pulse counted from the line 74 during the gate period corresponds substantially to one tenth of an ounce of pressure.

In a preferred embodiment, the NAND gates 206 and 208 are formed on the same integrated circuit chip as the NAND gates 140 and 148 and similarly, the operational amplifiers 160, 176, 198 and 222 are all formed on a single integrated circuit chip. The other circuit components are also of relatively small dimensions, whereby the entire monitor circuit 70 may be easily and conveniently mounted adjacent the sensor 59 on the planter, as illustrated by the monitor 14 mounted on the planter 12. Suitable cables may then be provided to connect the output terminals 74 and 76 with a readout or display console such as the display console 28 of FIG. 1 which may then be conveniently mounted to be viewed by the operator. It will be further noted that as the gate generator is included as part of the monitor circuit, it is not necessary to provide sensors 59 and oscillator circuits such as circuits 80 and 86 which give the same frequency of output signals for the same applied pressure. This is true, since the signal of interest is the number of pulses counted during the gate signal period, which is set by the variable resistor 216. Thus, the air pressure monitor according to the present invention is relatively simple and easy to manufacture, as strict control need not be maintained over the sensor components thereof, since variations are eliminated by the proper setting of the gate generator via the variable resistor 216. This design also permits complete interchangeability of the air pressure monitor among different display circuits such as the circuit of FIG. 4.

Although the foregoing description has been facilitated by addressing the specific problem of monitoring the air pressure in a planter, it is not intended to limit the invention thereto. It will be appreciated that the principles and embodiments disclosed and described herein are equally applicable to monitoring other functions, as, for example, fluid pressure in a hydraulic system. Also, for monitoring functions related to positional variations such as a governor for an engine, other means may readily be substituted for the diaphragm for varying the relative position of the core and coil, the invention functioning equivalently to the described application.

The specific example and embodiment shown and described herein is illustrative only. Various changes and modifications may occur those skilled in the art and will be understood as forming a part of the present invention insofar as they come within the spirit and scope of the appended claims.

The invention is claimed as follows:

1. A fluid pressure monitor comprising electromechanical sensor means having a variable impedance which varies systematically according to the fluid pressure applied to said sensor means, circuit means connected to said sensor means for producing output signal means suitable for driving a digital display corresponding to said fluid pressure applied to said sensor means, said circuit means including first oscillator means connected to said sensor means for producing a pressure signal at a frequency proportional to said pressure in response to said impedance of said sensor means, second oscillator means for producing a reference signal at a frequency corresponding to the frequency of said pressure signal produced by said first oscillator means when said pressure applied to said sensor means is substantially zero, mixer means connected to said first and second oscillator means for producing a difference signal at a frequency corresponding to the difference between the frequencies of said pressure and reference signals and signal conversion circuit means connected to said mixer means for converting said difference signal to produce said output signal means, said signal conversion circuit means including a trigger circuit connected to said mixer means for producing a plurality of pulses at substantially the same frequency as and in response to said difference signal and a divider circuit connected to said trigger circuit for decreasing the frequency of said pulses by a predetermined proportion to produce a divider circuit signal at a frequency suitable for driving a digital display so as to be readable, while maintaining a relatively high degree of resolution afforded by the proportionately higher frequencies of said first and second oscillator means.

2. A fluid pressure monitor according to claim 1, wherein said sensor means includes a flexible diaphragm whose deflection is proportional to the fluid pressure applied thereto, a variable inductor comprising a relatively movable coil member and core member, one of said members being attached to said flexible diaphragm for movement in response to the deflection thereof to vary the relative position of said core member and said coil member so as to vary the inductance of said coil member in proportion to said pressure, and said first oscillator means comprises a variable oscillator circuit including said coil.

3. A fluid pressure monitor according to claim 2, wherein said second oscillator means comprises a variable oscillator circuit substantially identical to said first mentioned variable oscillator circuit and including a coil substantially identical to said first-mentioned coil and a core positionable in said coil for producing said reference signal.

4. A fluid pressure monitor according to claim 3, wherein said mixer means comprises a balanced mixer circuit connected to said first and second oscillator circuits for mixing the pressure and reference signals therefrom to produce a plurality of mixer signals including said difference signal, and a filter circuit connected to said balanced mixer circuit for selectively passing substantially only said difference signal.

5. A fluid pressure monitor according to claim 4, wherein said signal conversion circuit means further includes a gate generator for producing a gate signal and including means for adjusting said gate signal to a predetermined period, such that the number of said pulses produced by said divider circuit during said predetermined period comprises a digital signal corresponding to a measurement in predetermined fixed units of said pressure applied to said monitor, said gate signal and said divider circuit signal comprising said output signal means.

6. A fluid pressure monitor according to claim 5, further including gate means connected to said gate generator and to said divider for gating through said pulses for said predetermined period to provide said digital signal, counter means connected to said gate means for counting said pulses gated through thereby and digital display means for providing a visual, digital indication of the number of said pulses counted by said counter means, said digital indication corresponding to said measurement of said pressure applied to said monitor in predetermined, fixed units.

7. In a mobile seed planting machine pulled by a tractor or the like, said planting machine including a rotating drum for distributing seeds to be planted, and means supplying pressurized air to said drum to facilitate said distribution, wherein it is desired for an operator of said tractor to monitor the pressure of said air in said drum to assure proper operation thereof, while maintaining his vision on the direction of travel of said tractor, an air pressure monitor comprising: sensor means including a flexible diaphragm coupled with said drum whose deflection is proportional to the air pressure in the drum and applied thereto, a variable inductor comprising a relatively movable coil member and core member, one of said members being interconnected with said flexible diaphragm for movement in response to the deflection there to vary the relative positions of said core member and coil member so as to vary the inductance of said coil member in proportion to said pressure applied to said diaphram, a digital display mounted on said tractor for viewing by said operator, and circuit means coupled with said coil member and with said digital display for producing an output signal means suitable for driving said digital display and corresponding to said air pressure in response to said inductance of said coil member.

8. An air pressure monitor according to claim 7, wherein said circuit means includes first oscillator means in circuit with said coil member for producing a pressure signal at a frequency proportional to said air pressure in response to said inductance of said coil member, second oscillator means for producing a reference signal at a frequency corresponding to the frequency of said pressure signal produced by said first oscillator means when said pressure is substantially zero, mixer means connected to receive said pressure and reference signals for producing a difference signal at a frequency corresponding to the difference between the frequencies of said pressure and reference signals and signal conversion circuit means connected to receive said difference signal for converting said difference signal to said output signal means corresponding to said air pressure.

9. A monitor for air pressure or a like function comprising: a movable member whose position is proportional to the function to be monitored, a variable inductor comprising a coil member and a core member, one of said members being attached to said movable member for movement in response to the position thereof to vary the relative position of said core member and said coil member so as to vary the inductance of said coil member to correspond to said position of said movable member, a first variable oscillator circuit including predetermined components connected in circuit with said coil member for producing a first signal at a frequency proportional to said inductance of said coil member, a second variable oscillator circuit comprising predetermined components substantially identical to said predetermined components of said first variable oscillator circuit including a relatively movable coil member and core member substantially identical to said first mentioned coil member and core member for adjusting said second oscillator to produce a reference signal at a frequency corresponding to the frequency produced by said first variable oscillator when said function being monitored is substantially zero, said first and second oscillator circuits each including one of a pair of logic gates, said pair of logic gates being substantially identical and formed on a single integrated circuit chip, whereby close thermal matching is assured, and frequency shifts due to temperature, aging or the like of said predetermined components, of said coil members and core members, or of said logic gates are matched between said oscillator circuits, and circuit means connected to said first and second oscillators for producing an output signal corresponding to said function to be monitored in response to the difference in frequency between said first and said reference signals, thereby substantially eliminating inaccuracies in said output signal due to said frequency shifts.

* * * * *